(12) United States Patent
Li

(10) Patent No.: US 8,624,986 B2
(45) Date of Patent: Jan. 7, 2014

(54) MOTION ROBUST DEPTH ESTIMATION USING CONVOLUTION AND WAVELET TRANSFORMS

(75) Inventor: Pingshan Li, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 13/077,677

(22) Filed: Mar. 31, 2011

(65) Prior Publication Data

US 2012/0249833 A1 Oct. 4, 2012

(51) Int. Cl.
 *H04N 5/228* (2006.01)
 *H04N 5/225* (2006.01)

(52) U.S. Cl.
 USPC .............. 348/208.13; 348/220.1; 348/208.5

(58) Field of Classification Search
 USPC ......... 348/220.1, 241, 207.99, 208.6, 208.14, 348/208.13, 208.2, 208.3, 208.1, 208.5; 382/168, 172, 254, 255, 263, 264, 275, 382/280
 See application file for complete search history.

(56) References Cited

U.S. PATENT DOCUMENTS

| | | | | |
|---|---|---|---|---|
| 7,957,599 | B2 * | 6/2011 | Berkner et al. | 382/232 |
| 8,422,827 | B2 * | 4/2013 | Ishii et al. | 382/299 |
| 2003/0117511 | A1 * | 6/2003 | Belz et al. | 348/333.11 |
| 2007/0019883 | A1 | 1/2007 | Wong | |
| 2007/0036427 | A1 * | 2/2007 | Nakamura et al. | 382/154 |
| 2007/0274570 | A1 * | 11/2007 | Hamza | 382/117 |
| 2008/0013861 | A1 | 1/2008 | Li | |
| 2009/0268985 | A1 | 10/2009 | Wong | |
| 2010/0039538 | A1 * | 2/2010 | Ikedo | 348/241 |

FOREIGN PATENT DOCUMENTS

| | | |
|---|---|---|
| GB | 2379113 A | 2/2003 |
| WO | 2007022329 A2 | 2/2007 |
| WO | 2007052191 A2 | 5/2007 |

OTHER PUBLICATIONS

Zhang et al.—"Multi-Scale Blur Estimation and Edge Type Classification for Scene Analysis"—Abstract Only, Int. Jour. of Computer Vision, vol. 24, No. 3, Sep. 1997, pp. 1-2.
Bae, S. et al.—"Defocus Magnification"—Eurographics 2007, vol. 26, No. 3, pp. 1-9.

* cited by examiner

*Primary Examiner* — Lin Ye
*Assistant Examiner* — Euel Cowan
(74) *Attorney, Agent, or Firm* — John P. O'Banion

(57) ABSTRACT

Apparatus and method for electronically estimating focusing distance between a camera (still and/or video camera) and a subject. Images at different focal positions of a calibration target are collected to arrive at a focus matching model for a given imaging apparatus. In operation, at least two images are captured and convolutions performed which approximate the modeling of blur change as a point spread function. Wavelet transforms are applied to the images after each convolution and images are compared based on the wavelet variance differences to provide a motion robust blur difference determination. Applying the blur differences to the focus matching model provides an estimate of focusing distance, which can be utilized such as for controlling camera focus.

20 Claims, 12 Drawing Sheets

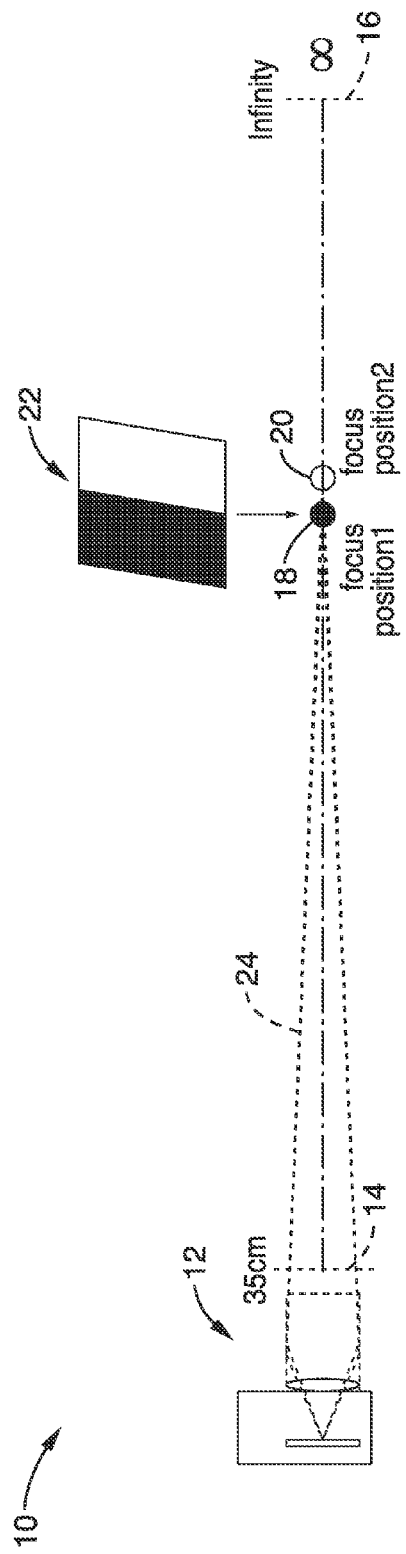
FIG. 1
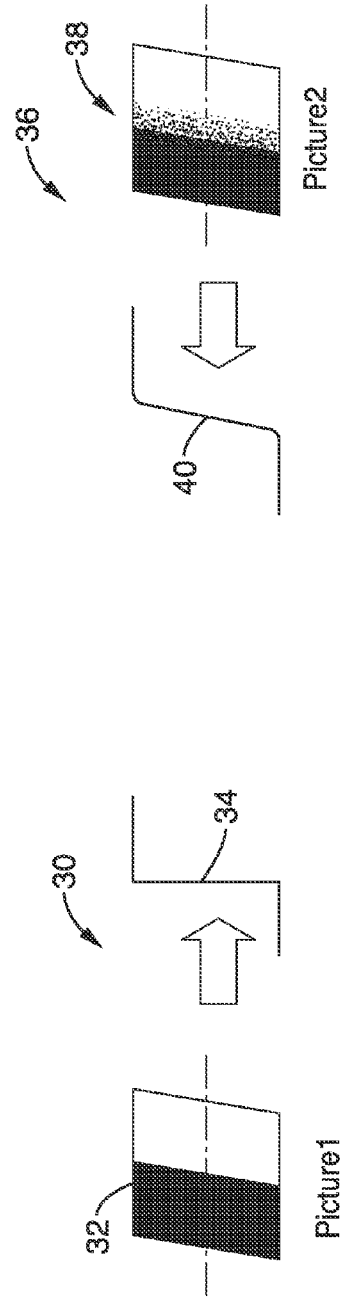
FIG. 2A
FIG. 2B

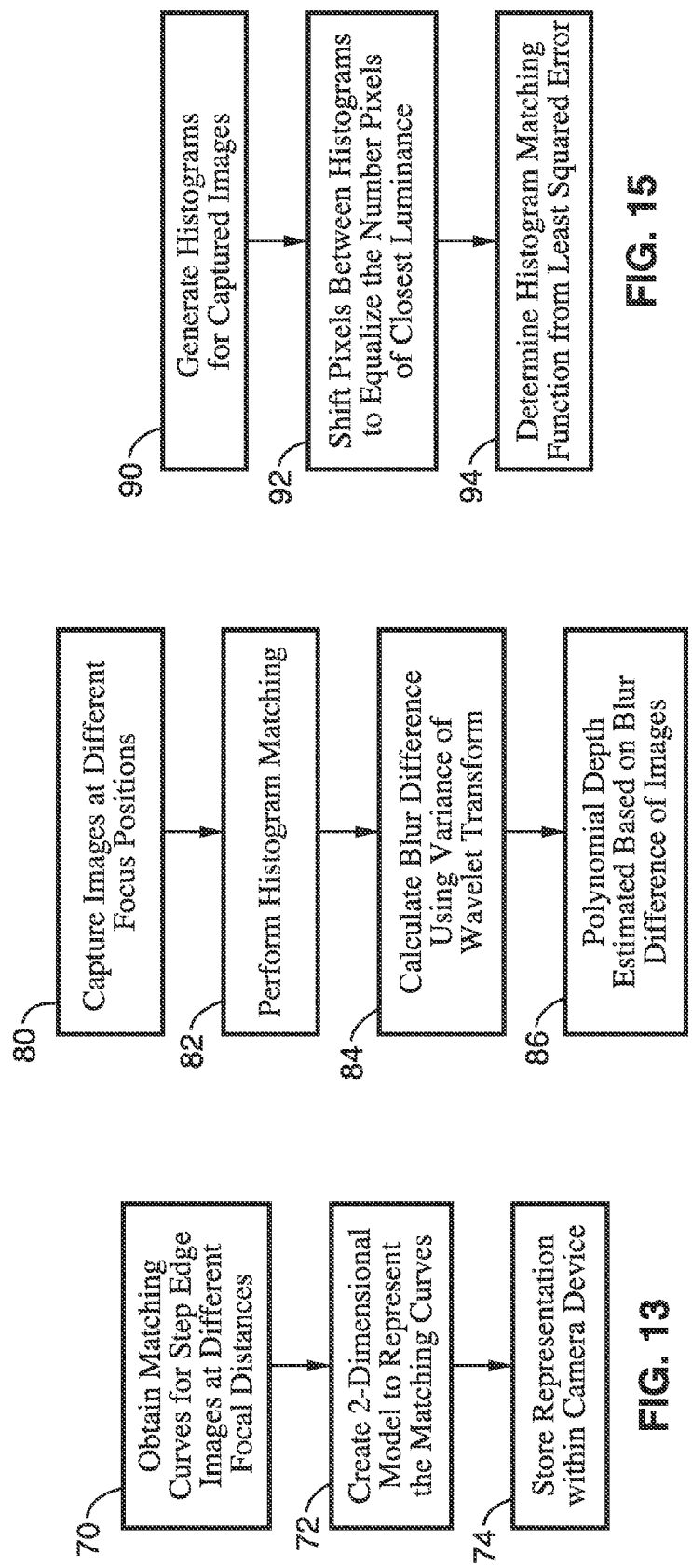

MOTION ROBUST DEPTH ESTIMATION USING CONVOLUTION AND WAVELET TRANSFORMS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §114.

BACKGROUND OF THE INVENTION

1. Field of the Invention

This invention pertains generally to image acquisition and processing, and more particularly to depth estimation.

2. Description of Related Art

Proper camera focus is a critical metric when capturing an image with an image acquisition device (video or still image). Numerous systems have been developed for estimating or attaining a proper camera focus. As a camera-lens system has a number of related elements and characteristics, a brief discussion follows of these elements and their associated characteristics.

Generally speaking, the two main optical parameters of a photographic lens are maximum aperture and focal length. The focal length determines the angle of view, and the size of the image relative to that of the object (subject) for a given distance to the subject (subject-distance). The maximum aperture (f-number, or f-stop) limits the brightness of the image and the fastest shutter speed usable for a given setting (focal length/effective aperture), with a smaller number indicating that more light is provided to the focal plane which typically can be thought of as the face of the image sensor in a simple digital camera.

One form of typical simple lens (technically a lens having a single element) is that of having a single focal length (also referred to as a "prime lens"). In focusing a camera using a single focal length lens, the distance between lens and the focal plane is changed therein altering the focal point of the photographic subject onto that focal plane. So although the single focal length lens has a fixed optical relation and focal length, it is used in the camera to focus on subjects across a focal range span. Consequently, one should not confuse the fixed focal distance of a lens with the range of focal distance obtainable on a camera using that lens, whereby adjusting the position of that lens in relation to the focal plane alters focal distance.

In using a single focal length lens one would adjust aperture to select the amount of light with respect to desired shutter speed, and then adjust focus according to the subject-distance, which is also referred to as the focal distance and then capture an image. Often a macro setting is provided with a different focal length selection, on an otherwise single focal length lens, for taking close-up shots. A telephoto lens provides a very narrow angle of view with high magnification for filling the frame with images from distance objects.

It will be noted that multi-focal length lenses are usually referred to as "zoom" lenses, because image magnification can be "zoomed", or "unzoomed" as the case may be. Zoom lenses allow the user to select the amount of magnification of the subject, or put another way, the degree to which the subject fills the frame. It is important to understand that the zoom function of these lenses, or camera-lens systems, is conceptually separate from both the focus control and the aperture control.

Irrespective of whether a single-focal length lens or multi-focal length lens is utilized, it is necessary to properly focus the lens for a given subject-distance. An acceptable range of focus for a given focus setting is referred to as "depth of field" which is a measurement of depth of acceptable sharpness in the object space, or subject space. For example, with a subject distance of fifteen feet, an acceptable range of focus for a high definition camera may be on the order of inches, while optimum focus can require even more precision. It will be appreciated that depth of field increases as the focusing moves from intermediate distances out toward "infinity" (e.g., capturing images of distant mountains, clouds and so forth), which of course at that range has unlimited depth of field.

For a single focal length lens at a given aperture setting there will be a single optimum focus setting for a given distance from camera to the subject (subject-distance). Portions of the subject which are closer or farther than the focal distance of the camera will show up in the captured images subject to some measure of blurring, as depends on many factors that impact depth of field. However, in a multi-focal lens there is an optimum focus point for each lens magnification (lens focal length) obtainable by the lens. To increase practicality, lens makers have significantly reduced the need to refocus in response to zoom settings, however, the necessity for refocusing depends on the specific camera-lens system in use. In addition, the aperture setting can require changing in response to different levels of zoom magnification.

In early camera systems, focus could only be determined and corrected in response to operator recognition and a manual focus adjustment. However, due to the critical nature of focus on results, focusing aids were readily adopted. More recently, imaging devices often provide the ability to automatically focus on the subject, a function which is generically referred to today as "auto focus". Focus continues to be a point of intense technical development as each of the many existing auto focus mechanisms are subject to shortcomings and tradeoffs.

Although numerous focusing mechanisms exist, these can be divided into two general types of auto focus (AF) systems: (1) active auto focus and (2) passive auto focus. In active auto focus, one or more image sensors is utilized to determine distance to the focal point, or otherwise to detect focus external of the image capture lens system. Active AF systems can perform rapid focusing although they will not typically focus through windows, or in other specific applications, since sound waves and infrared light are reflected by the glass and other surfaces. In passive auto focus systems the characteristics of the viewed image are used to detect and set focus.

The majority of high-end SLR cameras currently use through-the-lens optical AF sensors, which for example, may also be utilized as light meters. The focusing ability of these modern AF systems can often be of higher precision than that achieved manually through an ordinary viewfinder.

In one form of passive AF system, phase detection is utilized, such as by dividing the incoming light through a beam splitter into pairs of images and comparing them on an AF sensor. Two optical prisms capture the light rays coming from the opposite sides of the lens and divert it to the AF sensor, creating a simple rangefinder with a base identical to the diameter of the lens. Focus is determined in response to checking for similar light intensity patterns and phase difference calculated to determine if the object is considered in front of the focus or in back of the proper focus position.

In another type of passive AF system, contrast measurements are made within a sensor field through the lens. The system adjusts focus to maximize intensity difference between adjacent pixels which is generally indicative of correct image focus. Thus, focusing is performed until a maximum level of contrast is obtained. This form of focusing is slower than active AF, in particular when operating under dim light, but is a common method utilized in low end imaging devices.

Passive systems are notoriously poor at making focal decisions in low contrast conditions, notably on large single-colored surfaces (solid surface, sky, and so forth) or in low-light conditions. Passive systems are dependent on a certain degree of illumination to the subject (whether natural or otherwise), while active systems may focus correctly even in total darkness when necessary.

Accordingly, a need exists for improved auto focusing techniques which provide rapid and accurate subject-distance estimations and/or focus control under a wide range of conditions. The present invention fulfills that need as well as others and overcomes shortcomings of previous camera focus techniques.

BRIEF SUMMARY OF THE INVENTION

A method of camera depth estimation is described which is based on blur differences and multiple picture matching. This method computes a blur difference between images captured at different focus positions. The present invention utilizes a novel mechanism for determining the difference (blur) between images. Previous systems utilized some form of norm operator applied to the pixel-to-pixel difference between those images to compare the two images after convolution. In the inventive technique, a wavelet transform is applied to the images after convolution, and is followed by a calculation of variance of the wavelet coefficients. A difference of the two variances is then determined, such as preferably an absolute difference. As a consequence not needing to compare each pixel in a first image to a corresponding pixel position in a second image, apparatus and methods according to the invention provide a motion robust form of blur determination which is described herein within a system for estimating subject depth.

It should be appreciated that blur difference varies depending on lens focus and position in relation to the target image, which according to the present invention can be approximated using a polynomial model, such as preferably of at least two-dimensions. The polynomial model is calibrated, preferably off-line, such as by using a series of step-edge images, or similarly convenient calibration image mechanism for registering proper focus, and is then utilized for calculating the depth for images for a given image collection apparatus (e.g., camera make or model). Accordingly, the calibration target or subject is utilized in a characterization process in which the blur characteristics (focus characteristics) of the camera and lens system are determined and modeled for use during camera operations.

The discussion herein is directed primarily to a camera having a single focal length lens, however, the technique is applicable to multi-focal length lenses (e.g., "zoom" lenses) as will be discussed near the end of the specification. It will be appreciated that in addition to auto focusing, the depth estimation taught herein has many applications in areas including computer/robotic vision, surveillance, 3D imaging, and similar imaging systems.

According to a general description of the invention, matching curves are obtained for calibration images (e.g., step-edge images) at different distances across the whole focusing range, or a desired portion thereof. Then a multi-dimensional (e.g., two-dimensional) model is created, preferably a polynomial model, to represent the matching curves. The two-dimensional polynomial model can then be used for depth estimation when blur differences are computed on general images for the given apparatus.

The following terms are generally described in relation to the specification, and are not to be interpreted toward constraining specific recitations of the specification.

The term "histogram" is a statistical term describing a graphical display of tabulated frequencies, and generally shows proportionally the number of cases falling into each of several categories, whether discrete in bars or across a range.

The term "polynomial" as applied for modeling a matching curve is a polynomial function, such as having the general one dimensional form:

$$y = a_n x^n + a_{n-1} x^{n-1} + \ldots + a_2 x^2 + a_1 x^1 + a_0$$

in which n is a non-negative integer that defines the degree of the polynomial. It will be noted that a polynomial with a degree of 3 is a cubic, 2 is a quadratic, 1 is a line and 0 is a constant. Polynomial equations can be used for modeling a wide range of empirically determined relationships.

The term "convolution" as used herein describes a mathematical operation on two functions to produce a third function that is typically viewed as a modified version of one of the original functions. Often the second function is reversed and overlays a portion of the first function, toward more properly modeling a given data set.

The term "point spread function" (PSF) describes the response of an imaging system to a point source or point object, this is often also referred to as an impulse response, such as found across a step edge. In this context, the degree of spreading (blurring) of the point object is a measure for the focal quality of the imaging system.

The term "outlier" is a statistical term indicating that one or more observations in the empirical data set are numerically distinct or separate from the remainder of the data set. Outlier points may indicate systemic shortcomings, faulty data, and so forth, although a small number of outliers are expected in any large sample sets. Attempting to model the data set including the "outliers" could lead to a misleading model, wherein they are typically discarded once it is assured they do not properly represent the characteristics of the underlying function.

The invention is amenable to being embodied in a number of ways, including but not limited to the following descriptions.

One embodiment of the invention is an image capture apparatus, comprising: (a) an imaging device (or image source) as a means for obtaining an image; (b) a computer processor coupled to the imaging device (or source); (c) memory coupled to the computer processor configured for retaining programming executable on the computer processor, wherein said computer and memory are a means for processing images; (d) a focus matching model retained in the memory, and (e) programming executable on the computer processor for carrying out the steps of, (e)(i) capturing (or receiving) multiple object images, which is a means for obtaining object images, (e)(ii) performing convolutions to model blur changes as a point spread function between the multiple object images, (e)(iii) determining blur difference within each convolution in response to performing a wavelet transform, obtaining wavelet variance and comparing differences (e.g., absolute differences) of wavelet variance for the multiple object images, and (e)(iv) performing depth estimation in response to the convolutions within the focus matching model.

At least one embodiment of the invention utilizes a focus matching model based on imaging calibration targets obtained at different focal lengths. At least one embodiment of the invention is configured to utilize at least one size kernel when performing convolutions. For example, larger kernels may be used first to speed convergence, with progressively smaller kernels utilized to obtain the desired level of accuracy. At least one embodiment of the invention is configured for determining differences of wavelet variance, preferably an absolute difference of wavelet variances. At least one embodiment of the invention is configured for determining wavelet variance in at least one wavelet subband and at least one wavelet transform level. At least one embodiment of the invention is configured for determining wavelet variance in all wavelet subbands in at least one wavelet transform level. At least one embodiment of the invention is configured with the focus matching model utilizing a polynomial function, of any desired degree, to reduce mismatching noise. At least one embodiment of the invention is configured with coefficients of the polynomial function stored in memory.

At least one embodiment of the invention is configured for performing optional histogram matching of the object images to reduce noise from outliers between focal positions prior to inputting the blur differences into the focus matching model. Histogram matching need not be used in applications subject to significantly complex motions. At least one embodiment of the invention is configured for performing histogram matching in response to the steps comprising: (a) sequentially shifting pixels from a first histogram to a second histogram to equalize the pixels of closest luminance; and (b) approximating histogram matching utilizing a linear matching function; wherein noise effects are reduced which have been introduced into the focus matching model in response to undesired physical and environmental variations.

At least one embodiment of the invention is has a focus matching model generated in response to performing a calibration process on the apparatus in which a series of calibration target images are obtained for registering proper focus, with focus curves being obtained for the series of calibration target images; and a multi-dimensional model generated based on matching the focus curves for the series of calibration target images. At least one embodiment of the invention is configured with the imaging device comprising a still image camera, a video image camera, or a combination still and video image camera. At least one embodiment of the invention further comprises: (a) a focus control element coupled to the imaging device; (b) programming executable on the computer processor for adjusting the focus control element in response to performing depth estimation on object images based on inputting blur differences detected between object images into the focus matching model.

One embodiment of the invention is an image capture apparatus, comprising: (a) an imaging device; (b) a computer processor coupled to the imaging device; (c) memory coupled to the computer processor configured for retaining programming executable on the computer processor; (d) a focus matching model based on imaging calibration targets at different focal lengths which is retained in the memory, and (e) programming executable on the computer processor for carrying out the steps of, (e)(i) capturing multiple object images, (e)(ii) performing convolutions by at least one size of convolution kernel to model blur changes as a point spread function between the multiple object images, (e)(iii) determining blur difference within each convolution in response to performing wavelet transform, obtaining wavelet variance and comparing differences of wavelet variance in at least one wavelet subband and at least one wavelet transform level, for the multiple object images, and (e)(iv) performing depth estimation in response to the convolutions within the focus matching model.

One embodiment of the invention is a method of automatic estimation of camera-to-object focal depth, comprising: (a) generating a multi-dimensional focus matching model in response to detecting blur differences between multiple images of a calibration subject captured at different focal distances; (b) capturing multiple object images; (c) determining blur differences between the multiple object images in response to convolutions which model blur changes as a point spread function between the multiple object images; (d) determining blur difference within each convolution in response to performing wavelet transform, obtaining wavelet variance and comparing differences of wavelet variance for the multiple object images, and (e) performing depth estimation in response to the convolutions within the focus matching model.

One embodiment of the invention is an apparatus and method for determining blur difference between images in response to: (a) performing convolutions by at least one size of convolution kernel to model blur changes as a point spread function between the multiple object images; and (b) determining blur difference within each convolution in response to performing wavelet transform, obtaining wavelet variance, and comparing differences of wavelet variance in at least one wavelet subband and at least one wavelet transform level, for the multiple object images.

The present invention provides a number of beneficial elements which can be implemented either separately or in any desired combination without departing from the present teachings.

An element of the invention is a method for estimating distance to a subject (subject-distance, or camera focal distance) in response to capturing multiple images (or otherwise obtaining images) and matching multiple images during characterization of the camera-lens system at multiple focal points.

Another element of the invention is the use of distance estimation to estimate focus, or to control focus adjustments, within a camera system.

Another element of the invention is a subject-distance estimation method which can estimate distance in response to the input of images representing at least two focal settings taken of an image at a given subject-distance.

Another element of the invention is the use of an image comparison process which is motion robust, as it does not perform a comparison of pixels in corresponding positions in the images being compared.

Another element of the invention is a subject-distance estimation method which determines blur difference based on wavelet transforms applied to the subject images whose variance is compared.

Another element of the invention is a subject-distance estimation method which only requires the use of two image inputs for estimating a subject-distance, although additional inputs can be utilized for increasing estimation accuracy as desired, or for successive and/or continuous estimations.

Another element of the invention is a subject-distance estimation method in which multiple images with different focal settings are captured of an image having a fixed subject-distance, and blur information from these images is plugged into (processed through or by) the focus matching model which is solved for distance to generate an estimate of the actual subject-distance.

Another element of the invention is a subject-distance estimating method or apparatus which adopts a polynomial model to represent the empirical focus matching model.

Another element of the invention is a histogram matching method in which pixels are sequentially shifted from one histogram to the other to equalize the pixels of closest luminance in the other histogram to reduce the effects of noise introduced into the model in response to undesired physical and environmental variations, and is approximated by a linear matching function.

Another element of the invention is a subject-distance estimation apparatus and method which can be utilized for single focal point lenses, discrete focal point lenses (e.g., normal and macro settings), or continuously variable focal point lenses (e.g., zoom lenses).

Another element of the invention is a distance estimation apparatus and method in which a focus matching model can be generated for each discrete magnification setting of a camera, or at incremental positions along a continuously variable magnification (zoom) range.

A still further element of the invention is that depth estimation and focus can be determined for a wide range of imaging apparatus (e.g., still and/or video camera devices) configured for capturing images at different focus and zoom settings.

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a schematic of capturing multiple images at multiple focal points according to an element of the present invention.

FIG. 2A and FIG. 2B are schematic comparisons of calibration target (e.g., step edge) images according to an element of the present invention.

FIG. 13 is a flowchart of calibration according to an element of the present invention.

FIG. 14 is a flowchart of camera depth estimation based on two picture matching according to an element of the present invention.

FIG. 15 is a flowchart of histogram matching according to an element of the present invention.

DETAILED DESCRIPTION OF THE INVENTION

Figure 3:
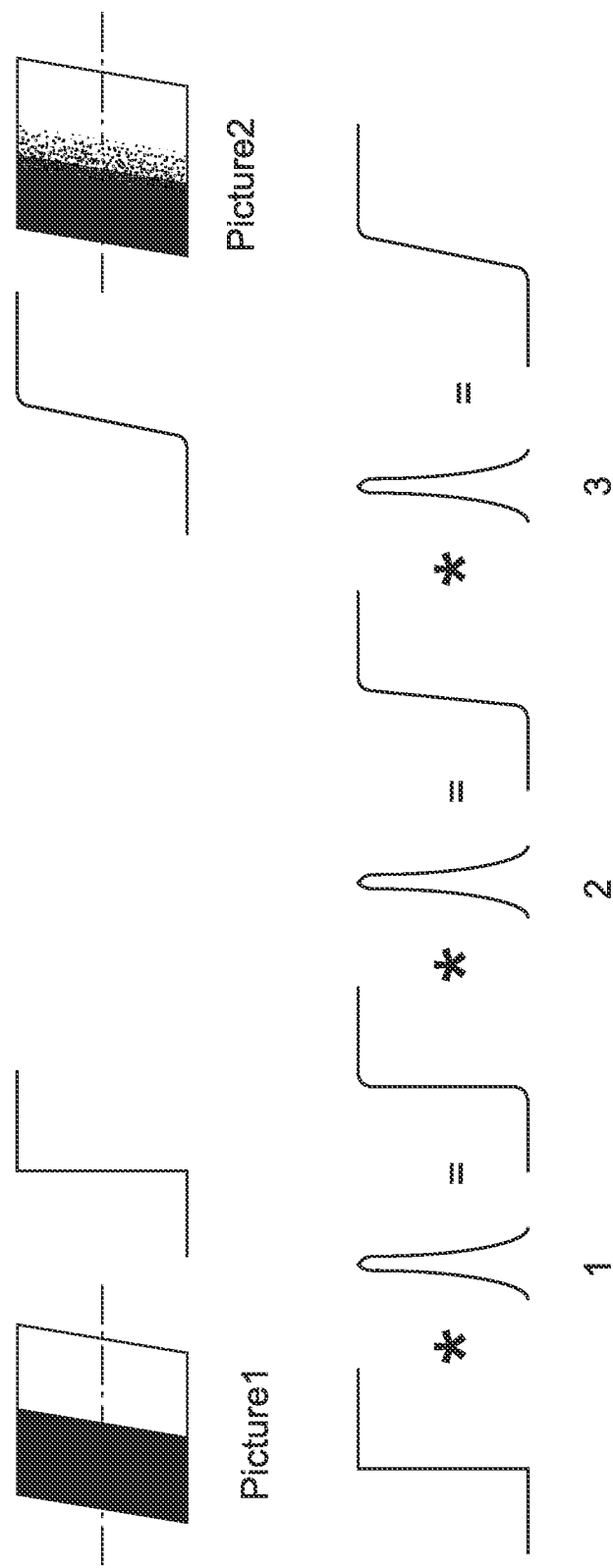
FIG. 3 is a schematic of computing blur difference in three iterations according to an element of the present invention.

1. Blur Difference.

In considering blur differences between images, it will be recognized that when a subject is in optimal focus, the captured image is the sharpest and accordingly provides the highest contrast in relation to images captured at less than optimal focus. The subject becomes increasingly blurry (less contrast) as the lens moves away from the in-focus position. Generally, when two pictures are captured (taken) of a specific subject at two different focus distances, the image captured closer to the subject distance is sharper than the other. The focus distances at which the pictures are taken and the amount of blur difference between these two pictures can be used in a proper model, calibrated for the specific camera model and/or make, to estimate the actual subject distance, or depth. In the present invention this depth estimation is performed in response to a polynomial model.

FIG. 1 illustrates an embodiment 10 in which multiple images are captured of a calibration target (or calibration subject), at different focal positions (subject-distances) when collecting a data set for a given imaging apparatus (e.g., specific embodiment, make or model of camera, or a family of cameras using the same/similar optical imaging elements). Collecting the data set comprises a characterization process for the camera-lens system at a given magnification setting (lens at a fixed focal length, zoom setting). An imaging device (camera) 12 is shown which can focus from a minimum focal length 14 on out to infinity 16. Minimum focal distance 14 (e.g., in this case 35 cm) is shown as well as focus at infinity 16. According to the invention, the focus converges to first focal position 18 and then to a second focal position 20, upon a calibration target 22, such as step-edge image, slate, graticule, or similar target having known optical characteristics, along focal path 24.

By way of example and not limitation, a Sony DSC-R1 camera was used herein to illustrate the inventive method, although one of ordinary skill in the art will appreciate the method can be utilized with other digital still and/or video cameras. The focusing distance of this camera ranges between the minimal focus distance (e.g., 35 cm for Sony DSC-R1) to infinity.

FIG. 2A depicts a condition 30 in which subject 32 is in focus, wherein the captured image is the sharpest, as represented by the sharp contrast curve 34, which is also referred to as the "edge profile" of the step edge. It will be appreciated that the calibration target, or subject, preferably provides a mechanism for simply determining the sharpness of focus based on contrast. For example in a step-edge target, a clear step-edge delineation is made between at least two colors, shades, luminances, wherein the sharpness of focus can be readily determined from the sharpness of the contrast profile. It will be appreciated by one of ordinary skill in the art that the target can be configured in any of a number of different ways, in a manner similar to the use of different chroma keys and color bar patterns in testing different elements of video capture and output.

FIG. 2B depicts the condition 36 as the image of object 38 becomes increasingly blurry as the lens moves away from the 'in-focus' position, with a resulting sloped contrast curve 40 shown. Generally, when two pictures are taken at two different focal distances, the one taken closer to the subject-distance is sharper than the other. The focal distances at which the pictures are taken and the amount of the blur difference between these two pictures can be used to estimate the actual subject distance, or depth.

Consider a blur difference determination in which two pictures $f_A$ and $f_B$ are taken at positions A and B, with $f_A$ being sharper than $f_B$. The blur change can be modeled by a point spread function P from position A to position B according to $$f_A * P = f_B$$

where * denotes the operation of two dimensional convolution. Furthermore, the point spread function P can be approximated by using a series of convolutions by a blur kernel K according to $$P = K * K * \ldots * K. \quad (1)$$

For example a blur kernel K may be chosen as $$K = \frac{1}{64}\begin{pmatrix} 1 & 6 & 1 \\ 6 & 36 & 6 \\ 1 & 6 & 1 \end{pmatrix} \quad (2)$$

in which the amount of blur difference between $f_A$ and $f_B$ can be evaluated on the basis of how many convolutions are performed in Eq. (1). In actual implementation, the blur difference is more preferably obtained by an iterative process.

FIG. 3 illustrates an iteration process, herein exemplified with three iterations performed between picture $f_A$ (left) and picture $f_B$ (right).

Figure 4:
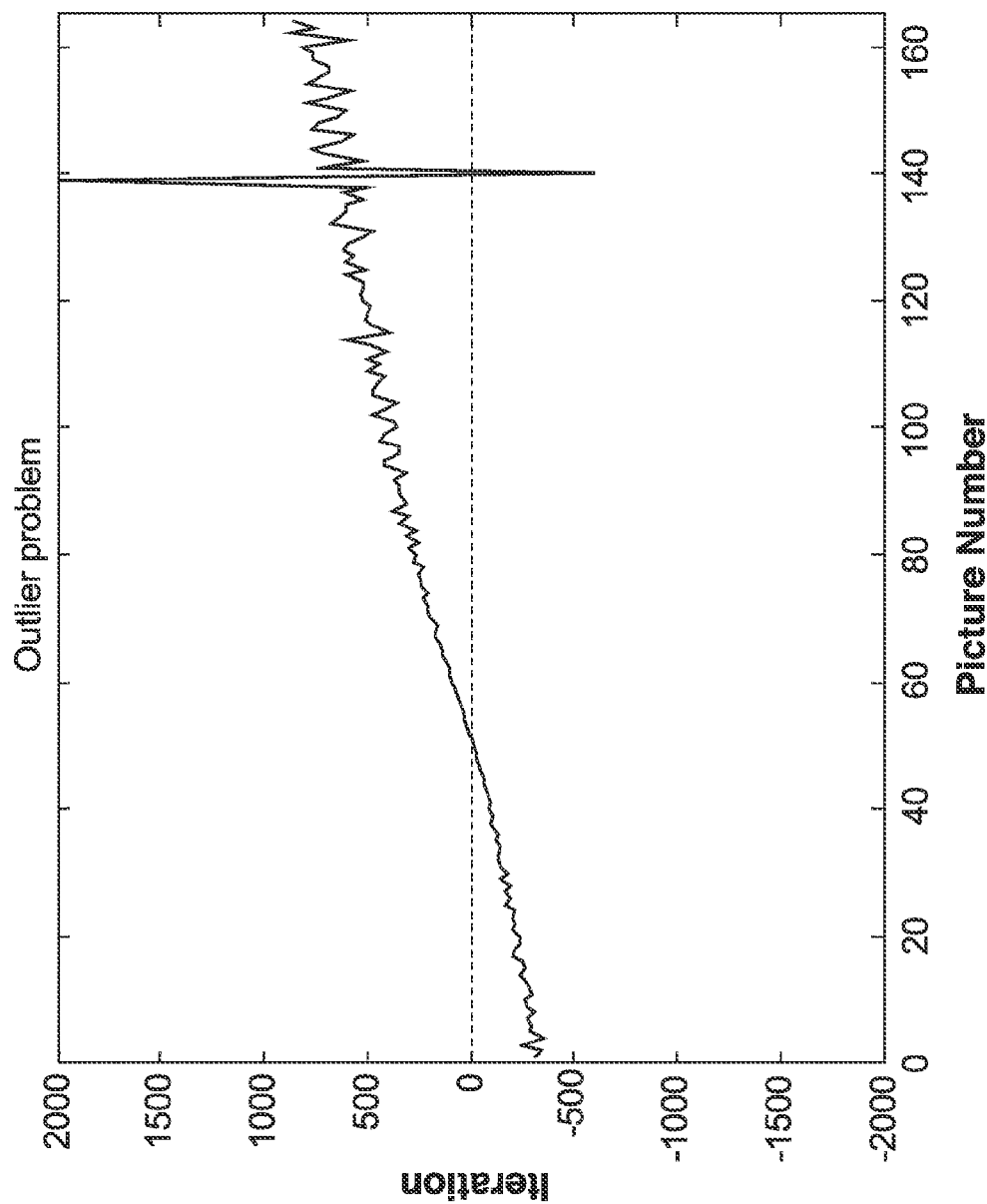
FIG. 4 is a graph of a matching curve collected according to an element of the present invention and showing the inclusion of outliers and noise.

FIG. 4 depicts a matching curve obtained for an image of a step-edge placed at a fixed distance (e.g., 100 cm). A first picture of the sequence is taken at the focus distance of infinity, then one picture is taken every time the lens is moved to focus at one depth of field closer, until the focus distance reaches the minimal focus distance. This sequence of pictures is denoted by $f_0, f_1, \ldots, f_{N-1}$, where N is the length of the sequence. In practice, to ensure the sequence covers the whole focus range, $f_0$ preferably starts at the distance slightly further than infinity, and $f_{N-1}$ is slightly closer than the specified minimal focus distance. These results were achieved using the DSC-R1 camera configured with software for controlling camera steps and sequences.

For a given focal depth, in order to find the relationship between the iteration number and the focus position, a sequence of pictures is taken for the whole focal range of the camera from which the blur difference between every two pictures can be calculated.

It should be appreciated what is meant by the iterations and in particular negative iteration numbers, as will be seen represented in certain figures (e.g., FIG. 4). Positive iteration numbers indicate that $f_A$ is sharper than $f_B$.

2. Correcting Motion Problems with Blur Difference Determinations.

Instead of relying on the use of the norm operator for blur difference calculations, the present invention applies wavelet transforms after an image convolution stage and compares absolute variances between these transforms.

Existing blur matching methods have difficulty with providing accurate results when motion arises between the images being compared when using the blur comparisons based on the norm operator. For example, motion can arise with respect to movement of the subject itself, motion of the camera, or a combination of these motions. Certain forms of motion, such as rotation and shape changing, are particularly troublesome for existing blur matching methods.

The present invention provides an improved mechanism for estimating blur differences between images. This comparison between images does not depend on the pixel correspondence between the two pictures, and is thus referred to as being motion robust. Use of the norm operator for calculating differences between two images, generally involves computing a difference between every two pixel values at the corresponding locations in two images. However, the norm operator approach does not provide accurate results if motion arises and the object locations change in the two images.

In general terms evaluating the difference between two images $f_A$ and $f_B$ can be expressed as a measure $G(f_A, f_B)$. This measure $G(f_A, f_B)$ was previously determined in response to using a norm operator $\|f_A - f_B\|$, such as in certain prior applications of the inventor. However, in the present invention $G(f_A, f_B)$ is determined in response to performing a wavelet transform on the images and then determining the variance between the wavelet transforms. If the variances $s_A^2$ and $s_B^2$ are calculated from the wavelet coefficients for $f_A$ and $f_B$ respectively, then $$G(f_A, f_B) = |s_A^2 - s_B^2|$$

is the difference measure between two pictures as utilized in the present invention for determining blur difference.

Accordingly, the absolute value of the iteration number can be calculated in the present invention by using the equation:

$$I_{A\_B} = \arg\min_I G\left(f_A * \underbrace{K * K * \ldots * K}_{I \text{ convolutions}}, f_B\right)$$

and convolutions are performed, expressed by operator * with a kernel K.

The wavelet variance is determined for at least one subband in at least one level of the wavelet transform structure. In the present implementation, the variance was determined for all coefficients at a specific level, in this case the first level for the image, which by way of example has a size of 488×273 pixels. This means that the variance is calculated for all the coefficients in subbands $LH_1$, $HL_1$, $HH_1$ at this first level in this specific implementation.

Figure 5:
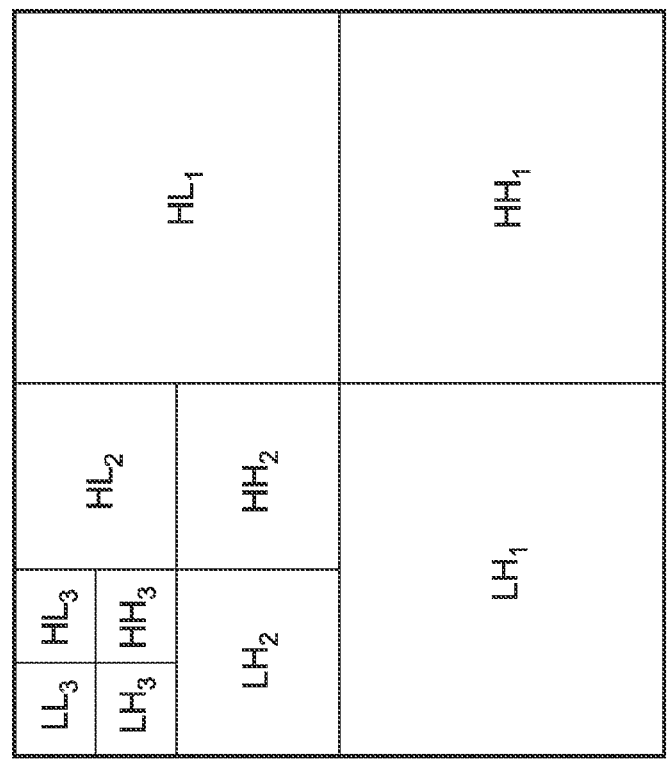
FIG. 5 is a pyramid representation of a wavelet transform utilized according to an element of the present invention, showing subbands and a three level transform structure.

FIG. 5 depicts a pyramid representation of a wavelet transform. It will be noted that each level has three subbands: LH, HL, HH. It will be appreciated that each level of wavelet transform generates four subbands: LL, LH, HL, HH, with the subsequent level wavelet transform is taken on the LL subband of the current level, wherein it transforms this LL subband into the next level of LL, LH, HL, HH subbands. and so forth. In general, LH, HL, HH subbands provide contrast or sharpness information of the image in different scales of resolutions. The figure illustrates a wavelet transform structure having three levels with $LH_1$, $HL_1$, $HH_1$ in a first level, $LH_2$, $HL_2$, $HH_2$, and $LH_3$, $HL_3$, $HH_3$ in a third level.

The following first considers each convolution of $f_A$ and K, after which a wavelet transform is performed on this blurred image. A variance is then determined (e.g., calculated) for the wavelet coefficients. According to one implementation the Haar wavelet is utilized for computational efficiency and the variance is determined for coefficients in all subbands (e.g., subbands LH, HL, and HH in FIG. 5) is determined at a specific wavelet transform level. Implementations of the invention can be practiced, however, in response to determining variance for at least one of the subbands within at least one of the wavelet transform levels (e.g., levels 1, 2 and/or 3 in the example). It will be appreciated that the inventive technique may be applied in response to different types of wavelet computations, consequently implementation is not limited to the use of the Haar transform.

In addition, the variance may be computed in different ways, such as with respect to different subband levels, edges and so forth without departing from the teachings of the present invention. In general, the invention can be practiced without the difference measure $G(f_A, f_B)$ being a norm operator or difference of the variances of the wavelet coefficients. For instance, it can be a difference of contrast or sharpness measures between the two images. However, performance varies in regard to the use of different forms of $G(f_A, f_B)$ computations. One object of the present invention is to provide an accurate and efficient means for determining that blur difference in a motion robust form.

In similar manner, a wavelet transform is applied to $f_B$ and again variance is determined of the wavelet coefficients.

After wavelet variances are determined for each image, then the absolute difference is determined between the above two variances for the blurred image of $f_A$ and $f_B$. This difference is considered the picture difference and replaces the norm calculation utilized in previous blur difference calculations. This difference does not depend on the pixel correspondence between the two images and therefore provides motion robust results in response to various type of motions, such as rotation and shape changing.

Figure 6:
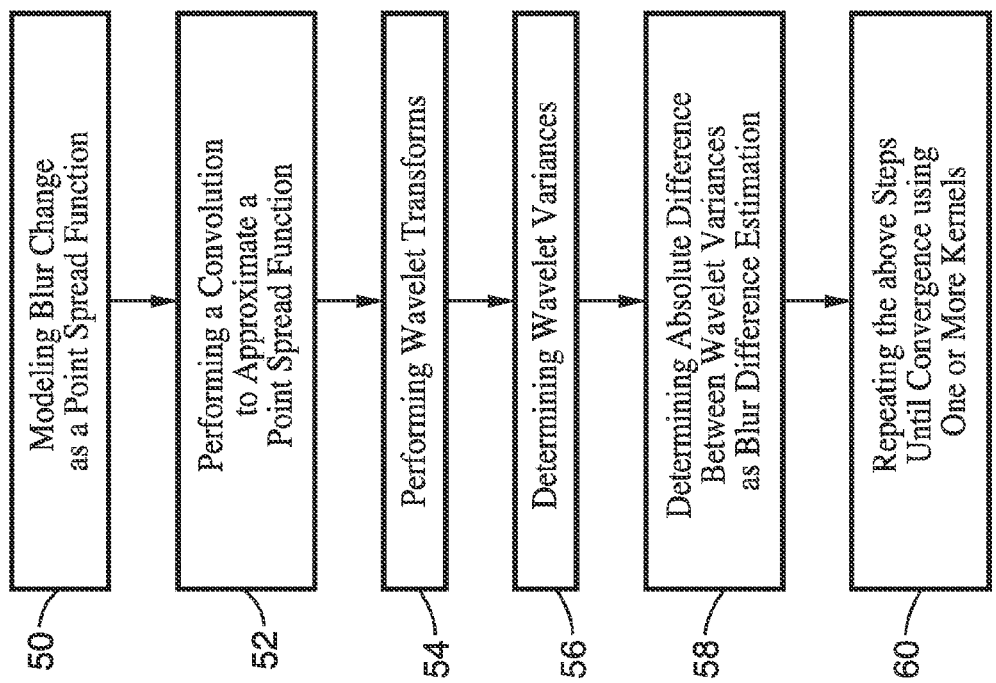
FIG. 6 is a flowchart of wavelet-based blur difference determination according to an embodiment of the present invention.

FIG. 6 illustrates an example embodiment of using convolutions in combination with wavelet transforms and wavelet variances to obtain blur differences. It will be appreciated that blur difference determination is utilized within a number of applications, such as the depth estimation. Blur change is modeled 50 as a point spread function which are approximated by performing convolutions 52 on the respective images. Wavelet transforms are applied 54 to the images and then a variance is determined 56 for each. Difference between the variances is determined 58, such as an absolute difference, which is used as a measure of the blur difference. Then the convolutions, wavelet transforms, and variances are repeated 60, until a desired end condition is met, such as convergence, reaching a maximum number of convolutions, or other desired end condition. It should be appreciated that the above convolutions can be performed in response to a single blur kernel, or in response to decreasing the kernel as convolution progress, as described in another invention by the applicant. In addition, the elements of the present invention can be applied to any application which utilizes the norm operator, or similar function, for determining blur difference after a convolution.

It should be appreciated that as the wavelet transform can be noise sensitive, in at least one embodiment of the invention a low-pass filter is applied to both images $f_A$ and $f_B$ before blur matching, such as just before block 52 of FIG. 6. Filtering should be performed just once on $f_A$ and $f_B$ before any convolution and wavelet transform.

Determination of blur difference according to this element of the invention can be applied to a wide range of image processing systems and devices, such as those related to absolute image focus, comparative image focusing, depth estimations, stereoscopic image processing, adjustment of image focus, and other electronic devices which can benefit from a rapid, accurate and motion robust means of determining blur difference.

3. Determining the Sharper Image.

It should be noted that when the two pictures are taken, it is unknown a priori which one of $f_A$ or $f_B$ is sharper, and thus is closer to the proper focal distance. Accordingly the method is configured to compute both Eqs. 3 and 4 below.

$$I_1 = \arg\min_l G\left(f_A\underbrace{*K*K*\ldots*K}_{l \text{ convolutions}}, f_B\right) \quad (3)$$

$$I_2 = \arg\min_l G\left(f_B\underbrace{*K*K*\ldots*K}_{l \text{ convolutions}}, f_A\right) \quad (4)$$

If $I_1$ is larger than $I_2$, then $f_A$ is sharper than $f_B$, wherein the value of iteration number (as in FIG. 4) will be $I_1$. Otherwise if $I_2$ is larger than $I_1$, then $f_B$ is sharper than $f_A$, and the value of iteration number (e.g., as in FIG. 4) will be $-I_2$. If $I_1$ and $I_2$ are equal, then the errors are compared, such as according to the following:

$$e_1 = G\left(f_A\underbrace{*K*K*\ldots*K}_{I_1 \text{ convolutions}}, f_B\right); \text{ and}$$

$$e_2 = G\left(f_B\underbrace{*K*K*\ldots*K}_{I_2 \text{ convolutions}}, f_A\right).$$

If $e_1$ is smaller than $e_2$, then $f_A$ is sharper than $f_B$; otherwise $e_2$ is smaller wherein $f_B$ is sharper than $f_A$. Alternatively, the variance values of the wavelet coefficients of $f_A$ and $f_B$ can be simply used to determine which image is sharper. The one with the larger variance value of the wavelet coefficients is the sharper image, which can be performed more readily with similar results than prior approaches.

The relationship between iteration number and focal positions for the depth of 100 cm is shown in FIG. 4. The blur difference between every two pictures $f_A$, and $f_B$ for i=0, ..., N−2 is calculated. The "picture number" axis indicates the image pairs for which the iteration number is calculated. For example, picture number 0 means that the iteration number is calculated between $f_0$ and $f_1$. It can be seen that the absolute value of the number of iterations increases when the lens focus position moves away from the subject distance. The zero-crossing point is where the subject is in focus.

Figure 8:
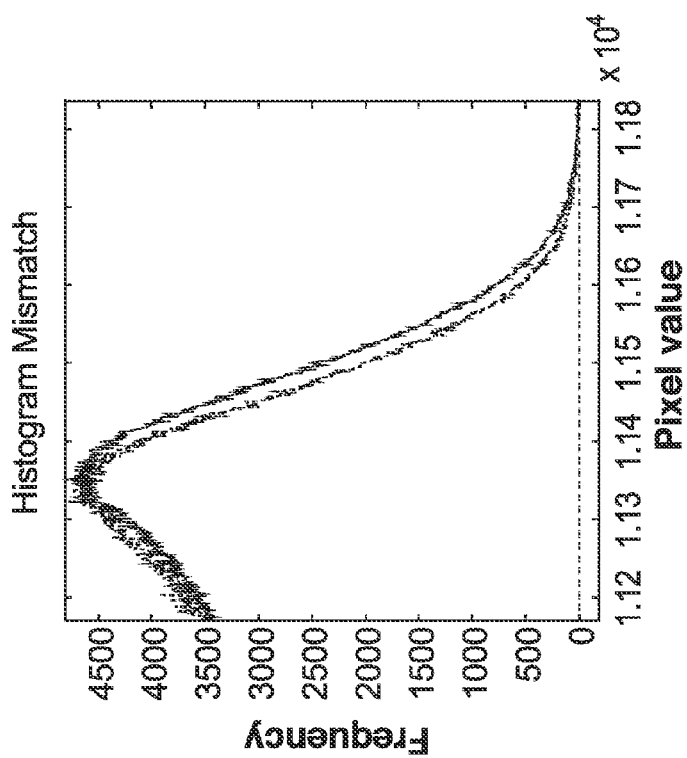
FIG. 8 is a magnified histogram showing a portion of the histogram depicted in FIG. 7.
Figure 7:
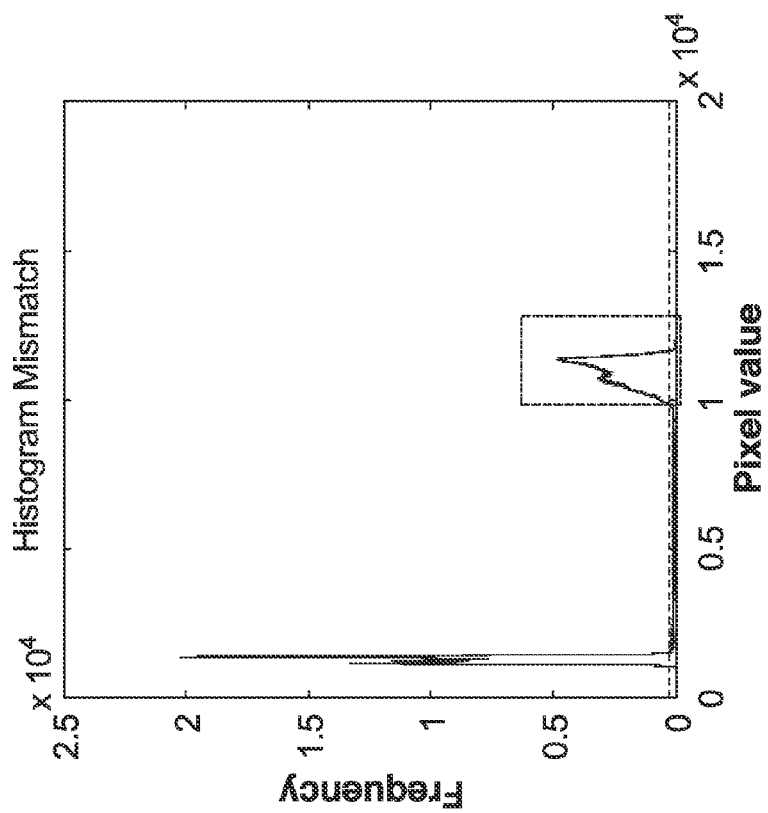
FIG. 7 is a histogram of mismatching between successive subject-distances according to an element of the present invention.

FIG. 7 and FIG. 8 compares the histograms for pictures 138 and 139 from FIG. 4, wherein significant mismatching is noted. It will be appreciated that this mismatching should be removed before subject-distance can be accurately computed based on blur.

4. Histogram Matching.

To correct for mismatching between images being compared, a matching procedure can be performed by modifying one histogram to match the other one. It will be appreciated that a simple linear matching function can be utilized, although other functions can be utilized. Pixels are sequentially shifted from one histogram to equalize the number of pixels of the closest luminance of the other histogram. In response to the shifting of pixels between two histograms, the matching function is determined, such as using a least squared error solution. Afterwards the histogram matching function is applied to the two pictures before the focusing matching is performed. It should be appreciated that histogram matching does not work well when the motions become complicated, wherein this is an optional step of the process which need not be applied to every application of the instant invention.

Figure 9:
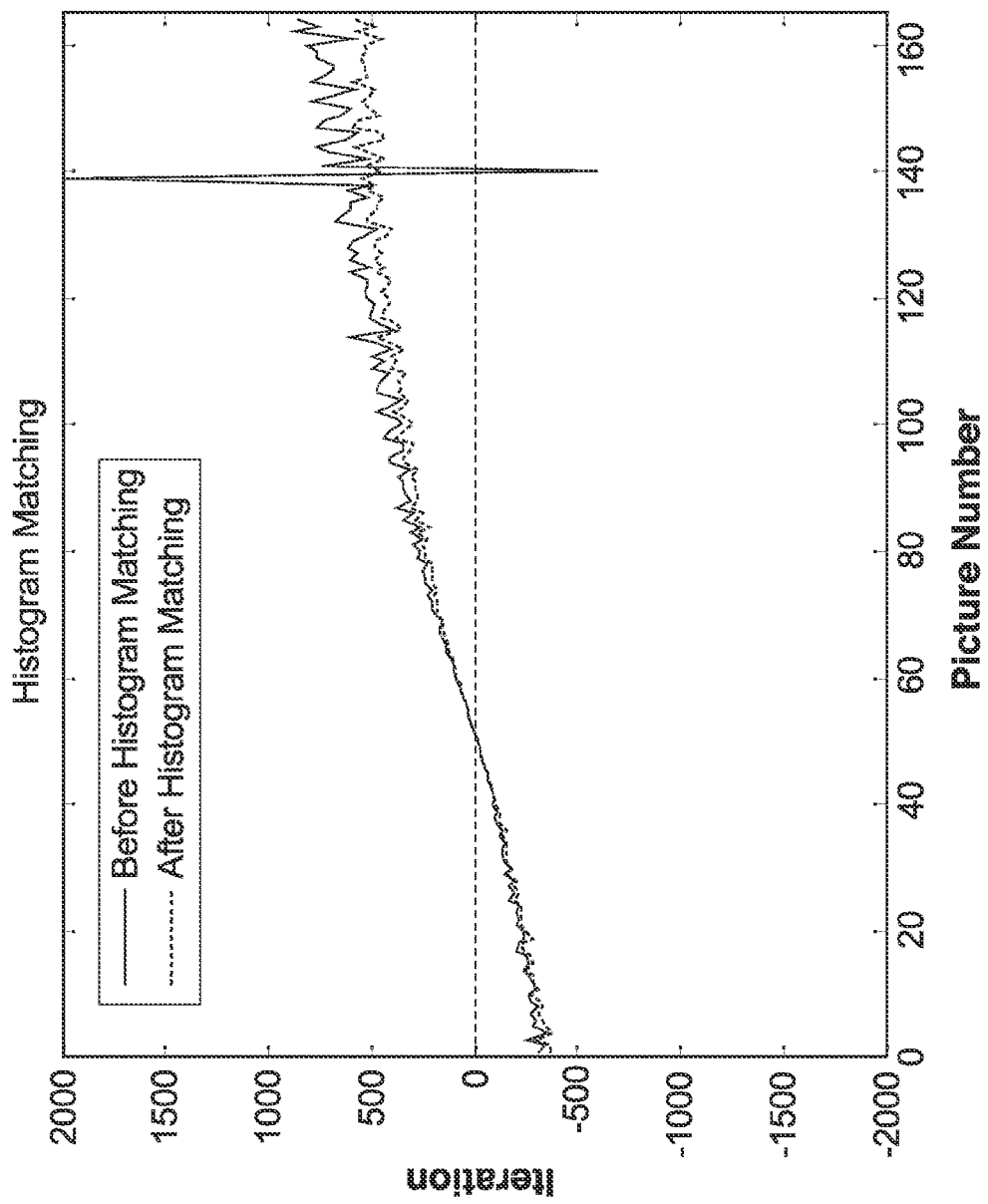
FIG. 9 is a graph of a matching curve showing matching before and after histogram matching according to the present invention.
Figure 10:
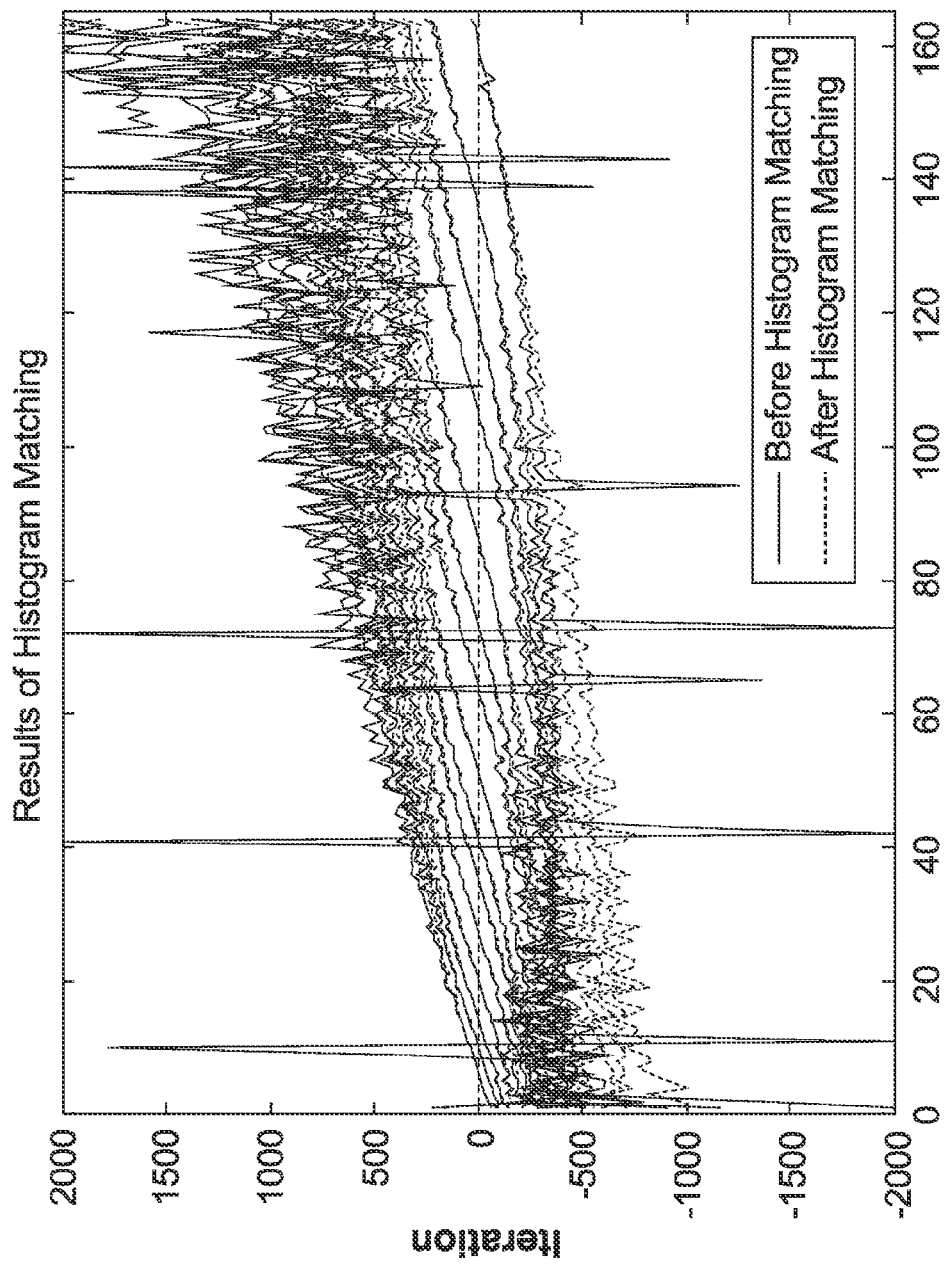
FIG. 10 is a graph of a matching curve across fifteen different distances showing matching before and after histogram matching according to an element of the present invention.

FIG. 9 and FIG. 10 depict iteration curves for different subject depths without histogram matching being applied before focus matching as shown in the solid lines, and with histogram matching as shown in the dashed lines. FIG. 9 depicts a single example while FIG. 10 depicts the iteration curves for fifteen different distances. The plots for FIG. 10 were generated by placing a step-edge at distances of infinity, 1000, 500, 300, 200, 150, 125, 100, 80, 70, 60, 50, 45, 40 and 35 cm, respectively. The iteration number I can be written as a function F of focus distance L and subject depth D.

$$I = F(L, D), \qquad (5)$$

where L and D are both measured by picture number, which physically means the number of depths of field measured from infinity, or from where picture 0 is defined. Depth estimation is a process to determine D given I and L. On the data shown in FIG. 10, Eq. 5 is used to model depth estimation.

The data shown in FIG. 4, FIG. 9 and FIG. 10 manifest significant signal noise. For instance, in FIG. 4, FIG. 7 and FIG. 8, noticeable outliers are seen at picture number 139. The source of these outliers may include changes of lighting conditions and aperture variations during the capturing process, as well as other physical camera and environmental variations.

It will be appreciated that in view of the mismatching seen in these figures, the histogram matching technique is applied to the images before the blur difference is calculated. Let $h_1$ and $h_2$ denote the histograms of two different images $f_1$ and $f_2$, respectively. Consider $h_1$ as the reference histogram and $h_2$ as the histogram to be modified to match $h_1$, wherein the following steps are performed.

(1) A pixel mapping matrix w(i,j) is generated.

(2) Setting w(i,j)=0 for every i and j ranging from 0 to the maximum gray level M.

(3) Find the smallest i that satisfies $h_1(i)>0$, and find the smallest j that satisfies $h_2(j)>0$.

(4) If $h_2(j) \geq h_1(i)$, set w(i,j)=$h_1(i)$, update $h_2(j)$ by $h_2(j) \leftarrow h_2(j) - h_1(i)$, and set $h_1(i)=0$.

Else If $h_2(j) < h_1(i)$, set w(i,j)=$h_2(j)$, update $h_1(i)$ by $h_1(i) \leftarrow h_1(i) - h_2(j)$, and set $h_2(j)=0$.

Steps 3 and 4 are then repeated until both $h_1$ and $h_2$ become 0 for all gray levels, which arises in response to the two pictures having the same number of pixels.

After the mapping matrix w(i,j) is created, a linear matching function H(x)=ax+b is constructed, such as using a weighted least squares regression method, where a and b are computed as follows:

$$b = \frac{\sum_{i=0}^{M} \sum_{j=0}^{M} w(i,j) \sum_{i=0}^{M} \sum_{j=0}^{M} [w(i,j)ij] - \sum_{i=0}^{M} \sum_{j=0}^{M} [w(i,j)i] \sum_{i=0}^{M} \sum_{j=0}^{M} [w(i,j)j]}{\sum_{i=0}^{M} \sum_{j=0}^{M} w(i,j) \sum_{i=0}^{M} \sum_{j=0}^{M} [w(i,j)j^2] - \left( \sum_{i=0}^{M} \sum_{j=0}^{M} w(i,j)j \right)^2} \qquad (6)$$

$$a = \frac{\sum_{i=0}^{M} \sum_{j=0}^{M} [w(i,j)i] - b \sum_{i=0}^{M} \sum_{j=0}^{M} [w(i,j)j]}{\sum_{i=0}^{M} \sum_{j=0}^{M} w(i,j)} \qquad (7)$$

Matrix w(i,j) is generally sparse. In one mode of the method only the non-zero values and their locations are stored to improve memory and computational efficiency.

The histogram matching function H(x) is applied to each pixel of $f_2$ before performing blur matching of the two images. The results of the histogram matching is shown in FIG. 10.

It should be appreciated that the main purpose of histogram matching is to remove outliers. Even after the matching procedure has been performed it can be seen that the matching curves still exhibit significant noise. Accordingly, after matching is performed the curves are modeled according to a polynomial model.

5. Two Dimensional Polynomial Model.

The matching curves described above can be approximated using a multi-dimensional polynomial function, such as a two-dimensional (2-D) polynomial function, to facilitate calculations while removing a large portion of the mismatching noise seen in FIG. 4 and FIG. 7 through FIG. 10.

In this model, the iteration number is a function of lens position and object distance. The coefficients are determined, for example in response to using a least squared error two-dimensional polynomial fitting algorithm. A two-dimensional polynomial is used to model the blur iteration function of Eq. 5.

$$I = \sum_{i=0}^{m} \sum_{j=0}^{m} C(i, j) L^i D^j \qquad (8)$$

The coefficients C(i,j) are determined using a least squares multidimensional polynomial fitting method. The degree of the polynomial, m and n, are chosen depending on the use of specific lenses and applications. Examples of bi-quadratic (m=n=2) and bi-cubic (m=n=3) polynomials are shown in the figures.

By way of a first example, bi-quadratic function coefficients can be used to approximate the fitting algorithm. By way of example and not limitation, for a bi-quadratic approximation the curves can be represented by a 3×3 matrix, such as the following.

$$C(i, j) = \begin{bmatrix} -5.268385e+00 & 1.014786e+01 & -3.073324e-02 \\ -9.677197e+00 & -1.522669e-02 & 3.695552e-04 \\ 3.325387e-02 & -2.438326e-04 & -3.833738e-07 \end{bmatrix}$$

Figure 11:
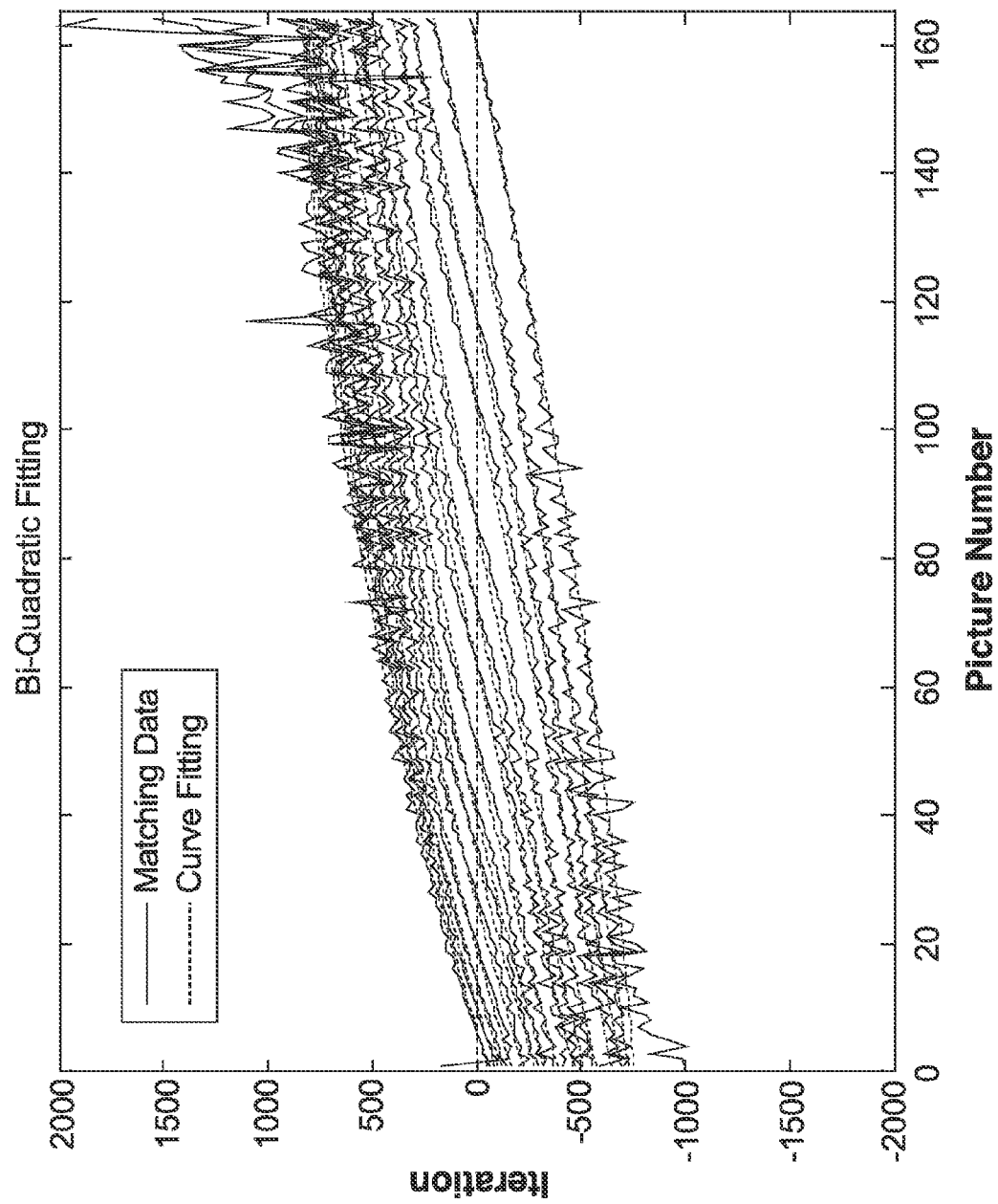
FIG. 11 is a graph of a matching curve showing the use of bi-quadratic fitting according to an element of the present invention.

FIG. 11 is a bi-quadratic fitting curve shown in the dashed lines in comparison with the matching data shown in solid lines. The smooth lines of bi-quadratic curve fitting is in stark contrast to the more jagged lines for the empirically collected matching data. It will seen that the polynomial provides a sufficient match with the matching data shown by the solid lines.

By way of a second example, bi-cubic function coefficients can be alternately utilized to approximate the fitting algorithm. By way of example and not limitation, for a bi-cubic approximation the curves can be represented by a 4×4 matrix, such as the following.

$$C(i, j) =$$

$$\begin{bmatrix} -2.096603e+01 & 1.414987e+01 & -1.356138e-01 & 5.802068e-04 \\ -1.074841e+01 & -1.387527e-01 & 4.771262e-03 & -2.600512e-05 \\ 8.499311e-02 & -4.243161e-04 & -3.456327e-05 & 2.485215e-07 \\ -3.199641e-04 & 6.471844e-06 & 5.348240e-08 & -6.416592e-10 \end{bmatrix}$$

Figure 12:
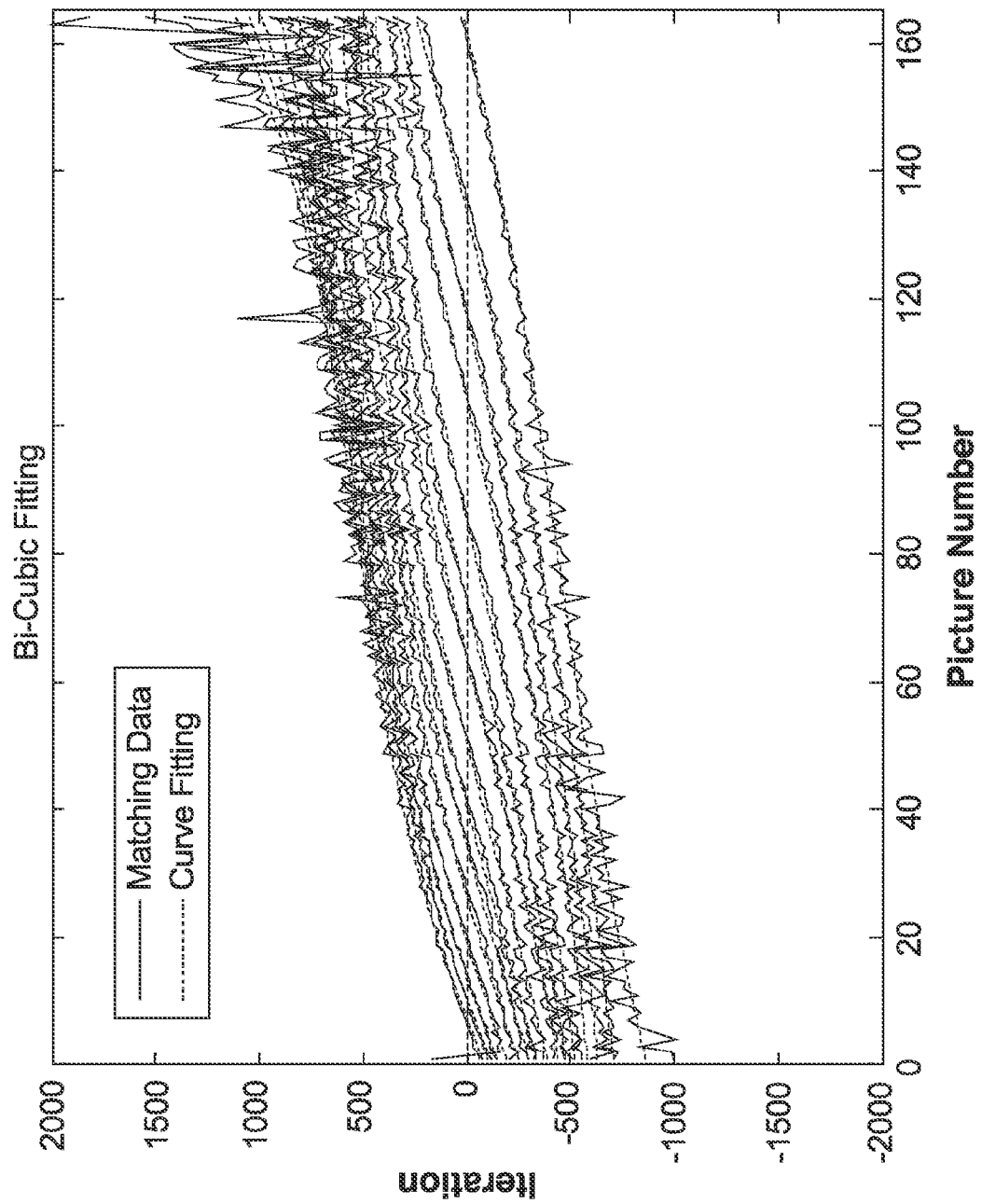
FIG. 12 is a graph of a matching curve showing the use of bi-cubic fitting according to an element of the present invention.

FIG. 12 depicts a bi-cubic fitting curve shown in the dashed lines in comparison with the matching data shown in solid lines. It will be seen that this bi-cubic polynomial provides a slightly closer match than that the bi-quadratic fit shown in FIG. 11.

6. Depth Estimation.

Using the model presented by Eq. 5, the depth estimation method is readily implemented. First, two images at different focal positions are captured, with distance between the focus positions being within one depth of field. It will be noted that the subject distance is not known at this moment, as this is what is being estimated. The two pictures used in the process can be captured at any distances as long as the difference between the focus positions of these two pictures is within one depth of field. Optionally, noise processing, such as histogram matching, may be performed on the captured image information prior to determination of blur difference. The blur difference between the captured images as calculated in regards to Eq. 2 through Eq. 5 becomes a single variable polynomial equation. The polynomial equation is solved for D, which results in generating an estimated depth of the object, also referred to as subject-distance. It should be noted that D can be configured in any desired format, such as an integer or floating point number. For auto focus applications, the lens can be moved to focus at the estimated distance D, and estimate the new depth in the same manner. The procedure may be repeated until the iteration number converges to 0, or below some desired threshold. It should be appreciated that this algorithm may be extended to higher dimensional polynomial models for varying focal lengths and apertures.

7. General Descriptions of Method and Apparatus.

FIG. 13 illustrates a calibration embodiment, such as would be performed by the manufacturer of a given imaging device, such as a camera. In block 70 matching curves are obtained for step-edge images at different focal lengths. A two-dimensional model is then created as per block 72 to represent the matching curves, by way of example as a multi-dimensional polynomial model. After this calibration process the representation of the model, such as its polynomial coefficients, are stored 74, for instance encoded into the non-volatile program memory of the camera device.

FIG. 14 illustrates an embodiment of using the multi-dimensional polynomial model for depth estimation within a camera device according to the present invention. After the calibration process (FIG. 13), the model is thus available for estimating object depth within the specific camera device. Represented in block 80, two images are captured (e.g., pictures taken) at two different focus positions. Histogram matching is preferably performed on the images as per block 82. Blur difference is then calculated in block 84 on each image by performing a wavelet transform, determining wavelet variance, and then comparing the absolute differences between the variances. After this the polynomial model is used in block 86 to estimate the depth based on the blur difference and the focus positions at which the two images were captured.

It should be appreciated that a series of depth estimations may be performed according to the present invention. For example if the method is utilized in concert with camera focus adjustment, then as the camera focus is adjusted, additional image input may be collected and the distance estimation process performed again (or continuously) to provide increasing accuracy as the camera nears proper focus when subject-distance estimates match up with the actual subject-distance.

In order to simplify the focus matching model and to smooth the response, it is desirable to eliminate errors arising from changes in physical camera elements (e.g., aperture variation, optical element power and temperature variation, mechanical lens setting fluctuations, and the like) and environmental factors (i.e., lighting, motion, temperature, position and so forth). Although the histogram matching process removed some noise source prior to determining blur difference, there is still a measure of noise which can be eliminated, such as was seen in FIG. 9. Toward removing additional noise, the focus matching model itself determined in response to the calibration process is preferably cast into a sufficiently smooth mathematical representation (function). This can representation comprising, according to an element of the present invention a polynomial function of a desired degree (e.g., 2, 3 or 4 degrees) which can be used for depth estimation. Thus, a function (e.g., polynomial function) is selected to substitute for the model created based on the empirically collected data. It will be appreciated that the substitute function should provide sufficient curve matching (fit) with the empirical data in order that use of the model will render sufficiently accurate distance estimations.

For example, given a lens position and an iteration number, a two-dimensional polynomial equation becomes a single variable equation. Elements of the invention describe examples of the single variable equation as a quadratic or cubic equation, which can be solved in one step. It should also be appreciated that the algorithm can be extended to higher dimensional polynomial functions as desired, for example for use with different focal lengths and apertures.

FIG. 15 illustrates the histogram matching process which is optionally performed, as seen in block 82 of FIG. 14, to remove noise prior to computing blur difference. It will be noted that in considering images subject to complex motions, the use of histogram matching can actually introduce error, wherein its use depends on the application and the expected motion of the images. As represented in block 90, histograms are generated for two pictures obtained at different focus positions. Pixels are sequentially shifted from one histogram to equalize the number of pixels of the closest luminance of the other histogram as per block 92. A histogram matching function is determined using a least squared error solution as represented in block 94. It should be recognized that a one dimensional linear functions preferably selected for this histogram matching function, by virtue of its simplicity. It should be recognized that the histogram matching function and the focus matching function are different and distinct, the latter being a two dimensional polynomial function.

Figure 16:
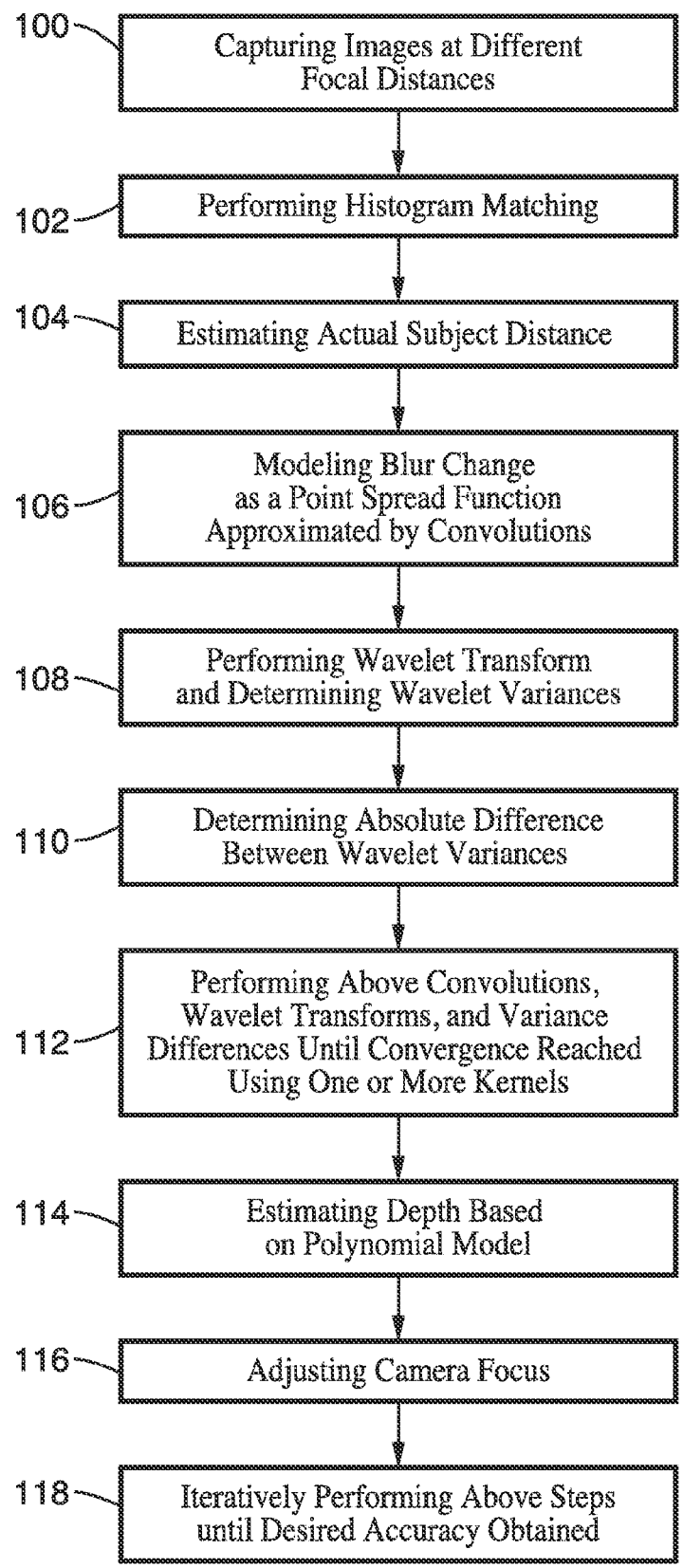
FIG. 16 is a flowchart of depth estimation according to an embodiment of the present invention.

FIG. 16 illustrates an example embodiment of using convolutions in combination with wavelet transforms and wavelet variances to obtain blur differences within an image capture system which estimates actual subject distance in response to blur difference within a polynomial. Images are captured at two subject images 100 and histogram matching, or an alternative process for removing outliers, optionally performed 102. Actual subject distances are estimated 104 and modeling is performed of blur change as a point spread function approximated 106 by convolutions. After a convolution on a wavelet transform is applied 108 to the images, wavelet variances are determined. After wavelet transforms are applied to both images $f_A$ and $f_B$, and wavelet variances determined, then the differences are determined 110, such as preferably a measure of absolute differences, between these variances as an estimation of the difference between the pictures and thus the blur difference. The preceding convolutions, wavelet transforms, and variance differences are repeated 112 using one or more convolution kernels until a desired level of convergence is reached or other desired threshold condition is reached. Depth is estimated 114 based on a polynomial model which has been previously determined for the camera system. In a system providing automatic focusing (as opposed to a system providing focus indicators), the focus is adjusted 116 on the image capture device (e.g., camera focus control), and the above steps iteratively performed 118 until the desired focus accuracy is obtained. It should be appreciated that the present invention can be implemented on a variety of devices and systems which are configured to perform any of a number of different forms of image processing and/or image capture. By way of example and not limitation the following describes an embodiment within a camera device.

Figure 17:
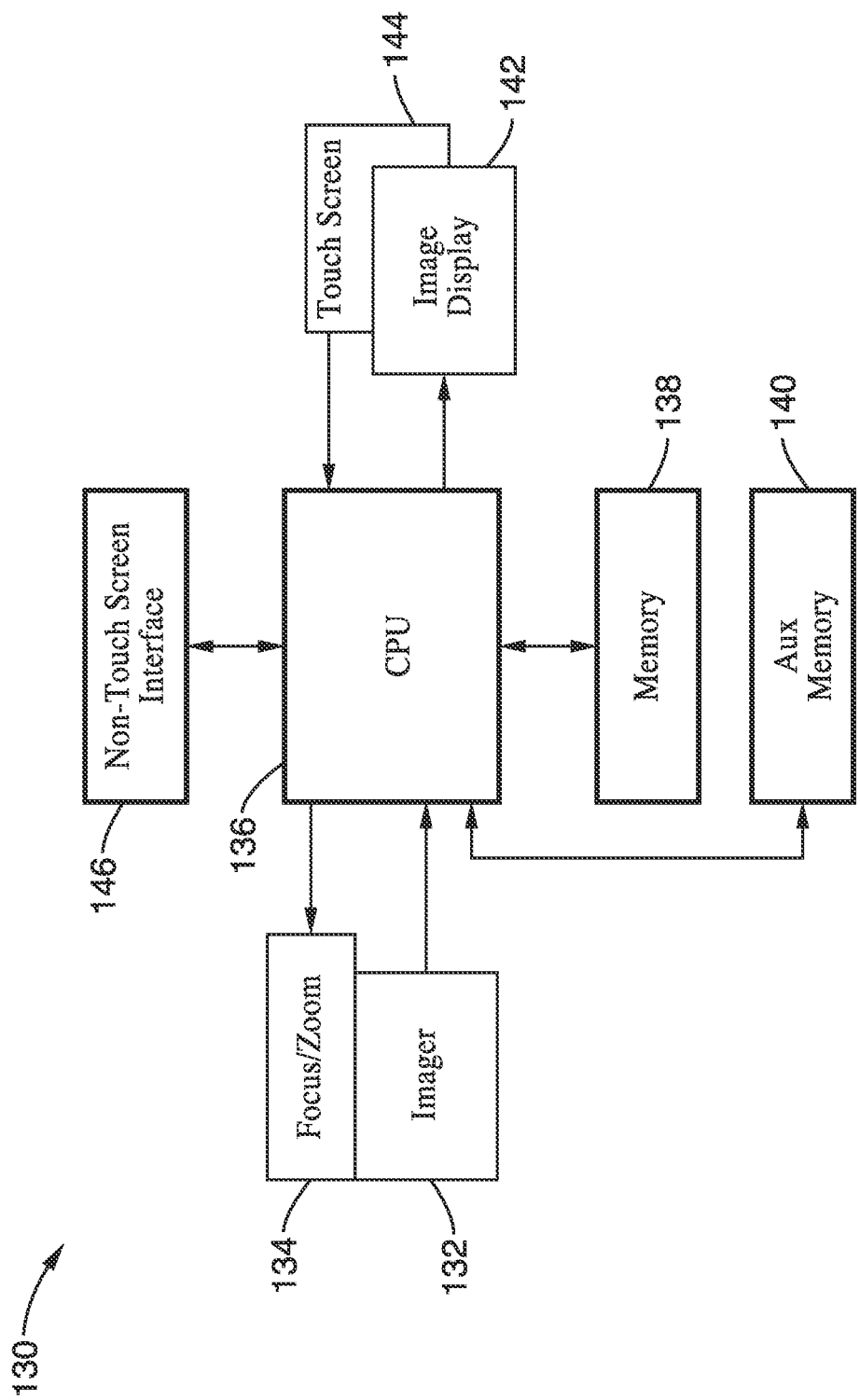
FIG. 17 is a block diagram of an image capture apparatus configured for performing depth estimation according to an element of the present invention.

FIG. 17 illustrates an example embodiment 130 of an image capture device (camera) 130 configured for depth estimation according to the invention. A focus/zoom control 134 is shown coupled to imaging optics 132 as controlled by a computer (CPU) 136. Computer 136 performs the depth estimation method in response to instructions executed from memory 138 and/or auxiliary memory 140. Shown by way of example for a camera device (e.g., video or still) are an image display 142 and touch screen 144, and non-touch interface 146. However, it should be appreciated that the apparatus and method according to the present invention can be implemented on various image capture devices which are configured with focus control, focus indicators, or combinations thereof. It should be appreciated that the calibration process (e.g., FIG. 13) which generates the model, such as defined by polynomial coefficients, is performed by a computer controlled test setup. The depth estimation and focusing control elements of the invention are preferably implemented in the camera device itself as depicted in FIG. 17, or a similar imaging device.

It should be appreciated that the blur difference determinations using convolutions combined with wavelet variance based comparisons as depicted in FIG. 6, histogram matching, polynomial modeling of depth estimation, and autofocus steps would all be preferably performed by computer processor 136 in combination with memory 138 and/or auxiliary memory 140. Although the computer processor and memory are described above in relation to an image capture device, it will be recognized that the computer and its associated programming may be used to perform the blur difference determination within any electronic device which performs image processing.

In regards to the use of a zoom control or other means of changing the lens focal length, also referred to as magnification, it should be appreciated that the camera and/or lens system in use will be preferably characterized according to the present invention across its applicable zoom range. For example, characterization of the camera and/or lens will be performed as described for each discrete focal length of lens setting in a camera having discrete lens selections, or at incremental steps along the zoom range of a camera having a continuously selectable zoom control. In this way the estimation of distance to a subject can be performed for single focal length lenses, as described, or for those having multiple ranges whether continuous ranges (e.g., zoom) or discontinuous which is more typically referred to as discrete ranges (e.g., normal/macro setting or other selectable range settings). In a prior section the extension of the two-dimensional (2D) polynomial model to higher dimensions has been described which provides for various focal lengths (different zoom positions) and apertures. By way of example and not limitation, Eq. (5) can be rewritten as I=F(L,D,Z,A) where Z is focal length, and A is the aperture to provide a four-dimensional polynomial model.

The present invention provides methods and apparatus of depth estimation using blur difference determinations based on wavelet transform and absolute variance comparisons which are motion robust. The teachings herein can be applied to a number of systems including cameras and any form of image capture device, in particular those configured for automatically detecting and/or adjusting focus. It should also be appreciated that the teachings can be applied without limitation to systems which process images from a separate camera device, or other image source, and in such systems which require blur difference comparisons, distance determinations, and/or focus control.

As can be seen, therefore, the present invention includes the following inventive embodiments among others:

1. An image capture apparatus, comprising: (a) an imaging device; (b) a computer processor coupled to the imaging device; (c) memory coupled to said computer processor configured for retaining programming executable on said computer processor; (d) a focus matching model retained in said memory; and (e) programming executable on said computer processor for carrying out the steps comprising, (e)(i) capturing multiple object images, (e)(ii) performing convolutions to model blur changes as a point spread function between said multiple object images, (e)(iii) determining blur difference within each convolution in response to performing a wavelet transform, obtaining wavelet variance and comparing differences of wavelet variance for said multiple object images, and (e)(iv) performing depth estimation in response to said convolutions within said focus matching model.

2. The apparatus of embodiment 1, wherein said focus matching model is based on imaging calibration targets obtained at different focal lengths.

3. The apparatus of embodiment 1, wherein programming executable on said computer processor is configured for performing said convolutions by at least one size of convolution kernel.

4. The apparatus of embodiment 1, wherein programming executable on said computer processor is configured for determining said differences of wavelet variance in response to a determination of absolute wavelet differences.

5. The apparatus of embodiment 1, wherein programming executable on said computer processor is configured for determining said wavelet variance in at least one wavelet subband and at least one wavelet transform level.

6. The apparatus of embodiment 1, wherein programming executable on said computer processor is configured for determining said wavelet variance in all wavelet subbands in at least one wavelet transform level.

7. The apparatus of embodiment 1, wherein said focus matching model utilizes a polynomial function to reduce mismatching noise.

8. The apparatus of embodiment 7, wherein coefficients of the polynomial function are stored in said memory.

9. The apparatus of embodiment 1, wherein programming executable on said computer processor is further configured for performing histogram matching of the object images to reduce noise from outliers between focal positions prior to inputting the blur differences into the focus matching model.

10. The apparatus of embodiment 9, wherein programming executable on said computer processor is configured for performing said histogram matching in response to steps comprising: (a) sequentially shifting pixels from a first histogram to a second histogram to equalize the pixels of closest luminance; and (b) approximating histogram matching utilizing a linear matching function; (c) wherein noise effects are reduced which have been introduced into said focus matching model in response to undesired physical and environmental variations.

11. The apparatus of embodiment 1, wherein the focus matching model is generated by performing a calibration process on said apparatus in which a series of calibration target images are obtained for registering proper focus, focus curves are obtained for the series of calibration target images; and a multi-dimensional model generated based on matching the focus curves for the series of calibration target images.

12. The apparatus of embodiment 1, wherein the imaging device comprises a still image camera, a video image camera, or a combination still and video image camera.

13. The apparatus of embodiment 1, further comprising: (a) a focus control element coupled to the imaging device; (b) programming executable on said computer processor for adjusting said focus control element in response to performing depth estimation on object images based on inputting blur differences detected between object images into said focus matching model.

14. An image capture apparatus, comprising: (a) an imaging device; (b) a computer processor coupled to the imaging device; (c) memory coupled to said computer processor configured for retaining programming executable on said computer processor; (d) a focus matching model based on imaging calibration targets at different focal lengths which is retained in said memory, and (e) programming executable on said computer processor for carrying out the steps of, (e)(i) capturing multiple object images, (e)(ii) performing convolutions by at least one size of convolution kernel to model blur changes as a point spread function between said multiple object images, (e)(iii) determining blur difference within each convolution in response to performing wavelet transform, obtaining wavelet variance and comparing differences of wavelet variance in at least one wavelet subband and at least one wavelet transform level, for said multiple object images, and (e)(iv) performing depth estimation in response to said convolutions within said focus matching model.

15. The apparatus of embodiment 14, wherein programming executable on said computer processor is configured for determining said differences of wavelet variance in response to a determination of absolute wavelet differences.

16. The apparatus of embodiment 14, wherein programming executable on said computer processor is configured for determining said wavelet variance in at least one wavelet subband and at least one wavelet transform level.

17. The apparatus of embodiment 14, wherein programming executable on said computer processor is configured for determining said wavelet variance in all wavelet subbands in at least one wavelet transform level.

18. The apparatus of embodiment 14, wherein said focus matching model utilizes a polynomial function, whose coefficients are stored in said memory, to reduce mismatching noise.

19. The apparatus of embodiment 14, wherein programming executable on said computer processor is further configured for performing histogram matching of the object images to reduce noise from outliers between focal positions prior to inputting the blur differences into the focus matching model.

20. A method of automatic estimation of camera-to-object focal depth, comprising: (a) generating a multi-dimensional focus matching model in response to detecting blur differences between multiple images of a calibration subject captured at different focal distances; (b) capturing multiple object images; (c) determining blur differences between the multiple object images in response to convolutions which model blur changes as a point spread function between said multiple object images; (d) determining blur difference within each convolution in response to performing wavelet transform, obtaining wavelet variance and comparing differences of wavelet variance for said multiple object images, and (e) performing depth estimation in response to said convolutions within said focus matching model.

Embodiments of the present invention may be described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An image capture apparatus, comprising:
   an imaging device;
   a computer processor coupled to the imaging device;
   memory coupled to said computer processor configured for retaining programming executable on said computer processor;
   a focus matching model retained in said memory, and programming executable on said computer processor for carrying out steps comprising:
   (i) capturing multiple object images;
   (ii) performing convolutions to model blur changes as a point spread function between said multiple object images;
   (iii) determining blur difference within each convolution in response to performing a wavelet transform, obtaining wavelet variance and comparing differences of wavelet variance for said multiple object images; and
   (iv) performing depth estimation in response to said convolutions within said focus matching model.

2. An apparatus as recited in claim 1, wherein said focus matching model is based on imaging calibration targets obtained at different focal lengths.

3. An apparatus as recited in claim 1, wherein programming executable on said computer processor is configured for performing said convolutions by at least one size of convolution kernel.

4. An apparatus as recited in claim 1, wherein programming executable on said computer processor is configured for comparing said differences of wavelet variance in response to an absolute difference of wavelet variance.

5. An apparatus as recited in claim 1, wherein programming executable on said computer processor is configured for determining said wavelet variance in at least one wavelet subband and at least one wavelet transform level.

6. An apparatus as recited in claim 1, wherein programming executable on said computer processor is configured for determining said wavelet variance in all wavelet subbands in at least one wavelet transform level.

7. An apparatus as recited in claim 1, wherein said focus matching model utilizes a polynomial function to reduce mismatching noise.

8. An apparatus as recited in claim 7, wherein coefficients of the polynomial function are stored in said memory.

9. An apparatus as recited in claim 1, wherein programming executable on said computer processor is further configured for performing histogram matching of the object images to reduce noise from outliers between focal positions prior to inputting the blur differences into the focus matching model.

10. An apparatus as recited in claim 9, wherein programming executable on said computer processor is configured for performing said histogram matching in response to steps comprising:
    sequentially shifting pixels from a first histogram to a second histogram to equalize the pixels of closest luminance; and
    approximating histogram matching utilizing a linear matching function;
    wherein noise effects are reduced which have been introduced into said focus matching model in response to undesired physical and environmental variations.

11. An apparatus as recited in claim 1, wherein the focus matching model is generated in response to a calibration process upon said apparatus in which a series of calibration target images are obtained for registering proper focus, with focus curves obtained for the series of calibration target images; and in which a multi-dimensional model is generated based on matching the focus curves for the series of calibration target images.

12. An apparatus as recited in claim 1, wherein the imaging device comprises a still image camera, a video image camera, or a combination still and video image camera.

13. An apparatus as recited in claim 1, further comprising:
a focus control element coupled to the imaging device; and
programming executable on said computer processor for adjusting said focus control element in response to performing depth estimation on object images based on inputting blur differences detected between object images into said focus matching model.

14. An image capture apparatus, comprising:
an imaging device;
a computer processor coupled to the imaging device;
memory coupled to said computer processor configured for retaining programming executable on said computer processor;
a focus matching model based on imaging calibration targets at different focal lengths which is retained in said memory, and
programming executable on said computer processor for carrying out steps comprising:
  (i) capturing multiple object images;
  (ii) performing convolutions by at least one size of convolution kernel to model blur changes as a point spread function between said multiple object images;
  (iii) determining blur difference within each convolution in response to performing wavelet transform, obtaining wavelet variance and comparing differences of wavelet variance in at least one wavelet subband and at least one wavelet transform level, for said multiple object images; and
  (iv) performing depth estimation in response to said convolutions within said focus matching model.

15. An apparatus as recited in claim 14, wherein programming executable on said computer processor is configured for comparing said differences of wavelet variance in response to an absolute difference of wavelet variance.

16. An apparatus as recited in claim 14, wherein programming executable on said computer processor is configured for determining said wavelet variance in at least one wavelet subband and at least one wavelet transform level.

17. An apparatus as recited in claim 14, wherein programming executable on said computer processor is configured for determining said wavelet variance in all wavelet subbands in at least one wavelet transform level.

18. An apparatus as recited in claim 14, wherein said focus matching model utilizes a polynomial function, whose coefficients are stored in said memory, to reduce mismatching noise.

19. An apparatus as recited in claim 14, wherein programming executable on said computer processor is further configured for performing histogram matching of the object images to reduce noise from outliers between focal positions prior to inputting the blur differences into the focus matching model.

20. A method of automatic estimation of camera-to-object focal depth, comprising:
executing a program stored on a computer processor, the processor,
generating a multi-dimensional focus matching model in response to detecting blur differences between multiple images of a calibration subject captured at different focal distances;
capturing multiple object images;
determining blur differences between the multiple object images in response to convolutions which model blur changes as a point spread function between said multiple object images,
determining blur difference within each convolution in response to performing wavelet transform, obtaining wavelet variance and comparing differences of wavelet variance for said multiple object images, and
performing depth estimation in response to said convolutions within said focus matching model.

* * * * *